United States Patent
Schmitz et al.

(10) Patent No.: US 7,714,041 B2
(45) Date of Patent: May 11, 2010

(54) METHOD OF INCREASING PLASTICITY OF TREAD COMPOSITION

(75) Inventors: Frank Schmitz, Bissen (LU); Claude Charles Jacoby, Luxembourg (LU); Marc Weydert, Strassen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 989 days.

(21) Appl. No.: 11/295,905

(22) Filed: Dec. 7, 2005

(65) Prior Publication Data

US 2006/0144489 A1 Jul. 6, 2006

Related U.S. Application Data

(60) Provisional application No. 60/640,789, filed on Dec. 30, 2004.

(51) Int. Cl.
 *B60C 1/00* (2006.01)
 *B60C 11/00* (2006.01)
 *C08L 9/00* (2006.01)

(52) U.S. Cl. .............. 523/351; 152/209.4; 152/209.5; 524/484; 524/490; 524/492; 524/525

(58) Field of Classification Search .............. 152/209.4, 152/209.5; 523/351; 524/484, 490, 492, 524/525
See application file for complete search history.

(56) References Cited

U.S. PATENT DOCUMENTS

| | | | |
|---|---|---|---|
| 3,842,883 A | 10/1974 | Masson et al. | |
| 4,675,349 A * | 6/1987 | Palombo et al. | 152/209.5 |
| 4,957,676 A | 9/1990 | Greenwood | |
| 5,585,064 A | 12/1996 | Moris-Herbeuval et al. | |
| 6,036,800 A | 3/2000 | Corvasce et al. | |
| 6,103,808 A * | 8/2000 | Hashimoto | 524/484 |
| 6,469,101 B2 | 10/2002 | Nahmias et al. | |
| 6,561,779 B2 | 5/2003 | Nitsch et al. | |
| 6,649,678 B1 | 11/2003 | Sandstrom | |
| 6,808,376 B2 | 10/2004 | Serener-Thielmann | |
| 6,822,043 B2 | 11/2004 | Sohnen et al. | |
| 7,015,272 B2 * | 3/2006 | Sandstrom | 524/495 |
| 7,045,578 B2 * | 5/2006 | Karato et al. | 524/492 |
| 2002/0045697 A1* | 4/2002 | Sohnen et al. | 524/492 |
| 2002/0198296 A1* | 12/2002 | Rawlinson et al. | 524/173 |
| 2003/0199626 A1* | 10/2003 | Lin et al. | 524/492 |
| 2004/0082702 A1* | 4/2004 | Sandstrom | 524/492 |
| 2004/0181004 A1* | 9/2004 | Sandstrom et al. | 524/492 |
| 2005/0009978 A1* | 1/2005 | Weydert et al. | 524/492 |
| 2005/0131112 A1* | 6/2005 | Henning et al. | 524/493 |
| 2005/0159513 A1* | 7/2005 | Henning et al. | 524/493 |
| 2005/0272850 A1* | 12/2005 | Jois et al. | 524/484 |
| 2006/0060285 A1* | 3/2006 | Weydert et al. | 152/905 |
| 2006/0144489 A1 | 7/2006 | Schmitz et al. | |
| 2006/0148945 A1* | 7/2006 | Schmitz et al. | 524/492 |

FOREIGN PATENT DOCUMENTS

| | | | |
|---|---|---|---|
| EP | 263216 A1 | | 4/1988 |
| EP | 1270657 | * | 1/2003 |
| EP | 1270657 A1 | | 1/2003 |
| EP | 1544238 A1 | | 6/2005 |
| JP | 4132751 | | 5/1992 |

OTHER PUBLICATIONS

European Patent Office, Extended European Search Report for related European Patent Application No. 05112689.4-2109, mailed Jun. 5, 2006.
U.S. Patent and Trademark Office, Office Action to related U.S. Appl. No. 11/193,514 mailed Jun. 25, 2008.
U.S. Patent and Trademark Office, Non-Final Official Action received in related U.S. Appl. No. 11/193,514 dated Dec. 11, 2008, 10 pp.
U.S. Patent and Trademark Office, Non-Final Official Action received in related U.S. Appl. No. 11/193,514 dated May 27, 2009, 16 pp.

* cited by examiner

*Primary Examiner*—Steven D Maki
(74) *Attorney, Agent, or Firm*—Wood, Herron & Evans, L.L.P.

(57) ABSTRACT

The plasticity of a tread composition may advantageously be increased by incorporating, for example, a relatively small amount of an ultra high molecular weight polyethylene ("UHMWPE"). A tread cap composition, in accordance with the principles of the invention, may be a composition resulting from the combination of components including: a sulfur-vulcanizable elastomer containing olefinic unsaturation; a reinforcing filler; a mineral oil softener; a silane coupling agent; and an ultra high molecular weight polyethylene ("UHMWPE").

7 Claims, No Drawings

METHOD OF INCREASING PLASTICITY OF TREAD COMPOSITION

CROSS-REFERENCE TO RELATED APPLICATION

This patent document claims the benefit of the filing date of Provisional U.S. Patent Application No. 60/640,789 entitled "Method of Increasing Plasticity of Tread Composition" and filed on Dec. 30, 2004. The entire disclosure of Provisional U.S. Patent Application No. 60/640,789 is incorporated into this patent document by reference. This application is also related to commonly assigned, copending application, Ser. No. 11/193,514, filed Jul. 29, 2005, and entitled "Tread Cap Composition," which claims the benefit of the filing date of Provisional U.S. Patent Application No. 60/640,788 entitled "Tread Cap Composition" and filed on Dec. 30, 2004.

BACKGROUND OF THE INVENTION

1. Field of the Invention

This invention is directed to tread cap compositions and products, and more particularly, to tread cap compositions and products that include one or more macro-fillers, such as for increasing the plasticity of the tread cap composition.

2. Description of Related Art

In developing a tread cap that provides an enhanced performance characteristic, a tread cap formulation has been proposed that includes an ultra high molecular weight polyethylene macro filler and a carbon black reinforcing filler.

While such a formulation may provide an enhanced performance characteristic, it does so at the expense of other desirable properties. For example, the composition may have an undesirable compound stiffness. In addition, other performance characteristics may be less than desirable. Therefore, there is a need for improved tread formulations.

SUMMARY OF THE INVENTION

A tread cap composition, in accordance with the principles of the invention, may be a composition resulting from the combination of components including: a conjugated diene-based elastomer; a reinforcing filler; a mineral- or vegetable-oil softener; a silane coupling agent; and an ultra high molecular weight polyethylene ("UHMWPE").

One aspect of the invention is directed to a method of making a tread cap composition for increasing the plasticity thereof. The method includes the steps of: mixing, at a temperature in a range of from about 135° C. to about 180° C., ingredients including: 100 phr of at least one conjugated diene-based elastomer; from about 30 to about 130 phr, or from about 50 to about 130 phr, of at least one reinforcing filler; from about 2 to about 55 phr, or from about 5 phr to about 55 phr, of at least one oil softener, the oil softener selected from the group consisting of a mineral oil having a PCA content of less than about 3% by weight, a vegetable oil, and combinations thereof; and from about 4 to about 20 phr of at least one silane coupling agent, thereby forming a first mixture. The method further includes mixing from about 0.1 to about 5 phr of an ultrahigh molecular weight polyethylene ("UHMWPE") with the aforementioned ingredients, thereby forming a tread-cap composition.

In one embodiment, a suitable tread composition, in accordance with the principles of the invention, may be made by combining and mixing the elastomer, or rubber, the reinforcing filler, the mineral oil softener, and the silane coupling agent in a first non-productive mix stage. These components may be blended and heated to a temperature in a range of from about 135 to about 180° C. If desired, this non-productive mix stage may have a duration of about 4.5 minutes, with the components being heated to a temperature of about 160° C.

Also, if desired, these same components may be mixed in a second non-productive mix stage, for example, for about 4.5 minutes to a temperature of about 160° C. Further, if desired, these components may be mixed and cooled in a third non-productive mix stage, to a temperature in a range of from about 23 to about 120° C. If desired, this third non-productive stage (i.e., a cold remill) may be for about 2 minutes to a temperature of about 110° C.

If desired, the UHMWPE may be added during a non-productive mix stage, for example, a mix stage in which the composition resulting from the blending of components is cooled to a temperature of less than about 120° C. Alternatively, or in addition, the UHMWPE may be added during the productive mix stage, if desired. In addition, any suitable curative, activator, and/or other productive stage component or components may be added. If desired, during the productive stage, the resulting composition may be heated to a temperature of from about 90 to about 125° C. For example, in one embodiment, the duration of the productive mix stage may be about 2 minutes, with the composition being brought to a temperature of about 110° C.

Other aspects of the invention include the tread cap composition, a tread made from the composition, and a tire that includes such a tread cap.

DESCRIPTION OF THE INVENTION

The plasticity of a tread cap composition may advantageously be increased by incorporating, for example, a relatively small amount of an ultra high molecular weight polyethylene ("UHMWPE"). A tread cap composition, in accordance with the principles of the invention, may be a composition resulting from the combination of components including: a sulfur-vulcanizable elastomer containing olefinic unsaturation; a reinforcing filler; a mineral oil softener; a silane coupling agent; and an ultra high molecular weight polyethylene ("UHMWPE"). As used herein, the term "ultra high molecular weight" means a molecular weight of about 500,000 or more.

The conjugated diene-based elastomer may be any suitable elastomer or combination of elastomers. Examples include polybutadiene rubber (including high cis and high vinyl), polyisoprene, natural rubber, isoprene-butadiene copolymer, emulsion-polymerized styrene-butadiene rubber, and solution-polymerized styrene-butadiene rubber (including low, mid, and high vinyl). Advantageously, the conjugated diene-based elastomer may be a sulfur-vulcanizable elastomer containing olefinic unsaturation.

The reinforcing filler may be any suitable reinforcing filler or combination of fillers. For example, the filler may include silica and/or carbon black. If desired, the reinforcing filler may be present in an amount of from about 30 to about 130 phr.

The oil softener may be any suitable mineral- or vegetable-oil softener or combination of such oil softeners. Examples of mineral oil softeners include a treated distillate aromatic extract ("TDAE") oil, a mild extraction solvate ("MES") oil, and a special residual aromatic extract ("S-RAE"). Advantageously, the mineral oil softener may have a polycyclic aromatic composition ("PCA") content of less than about 3% by weight. Also, if desired, the softener or combination of softeners may be present in an amount of from about 2 to about 55 phr. Examples of commercially available TDAE, MES, and S-RAE oils include Vivatec 500 oil from H&R Wasag AG (a TDAE oil), Catenex SNR oil from Shell (an MES oil), and NC140 oil from Japan Energy Corp. (an S-RAE oil).

The silane coupling agent may be any suitable agent or combination of agents. Examples include bis-3-(triethoxysilylpropyl) disulfide ("TESPD"), bis-3-(triethoxysilylpropyl) tetrasulfide ("TESPT"), and/or a blocked mercaptosilane. Advantageously, the blocked mercaptosilane is one or more of NXT or NXT-LoV from GE Silicones. If desired the silane coupling agent may be present in an amount of from about 4 to about 20 phr.

The UHMWPE may be any suitable UHMWPE. If desired, the UHMWPE may have a size in a range of from about 10 to about 200 micrometers, a molecular weight in a range of from about 500,000 to about 11,000,000, a standard bulk density of about 0.4 g/cm$^3$ or greater, and a low bulk density of about 0.25 g/cm$^3$ or less. If desired, the UHMWPE may be present in an amount of from about 0.1 to about 5 phr. Also, if desired, the UHMWPE may be present in an amount of from about 2 to about 3 phr. One example of a suitable UHMWPE is GUR® 4120 from the Ticona Company. GUR® 4120 has an average molecular weight of 5,000,000 g/mol, as calculated using Margolies' equation (M=5.37·104[η]$^{1.49}$ where η is in dl/g).

The tread cap composition may be made using any suitable method or methods, and any suitable, commercially available manufacturing equipment. Likewise, the resulting tread product and tire including the tread cap product may be made using any suitable method or methods and any suitable, commercially available equipment.

EXAMPLE

The following example further illustrates several aspects of the invention. However, the invention is not limited by the example.

In this example, tread cap compositions that included an amount of UHMWPE, and in some cases, an additional amount of a mineral oil softener, were compared with a tread cap composition that did not include these ingredients. In addition, tread cap compositions in which the UHMWPE was added during a first non-productive mix stage were compared with tread cap compositions in which the UHMWPE was added in a subsequent cold-remilling stage.

With reference to Table I, sample A was the control sample, and did not include any UHMWPE or additional mineral oil softener. In the first non-productive mix stage, ingredients were added to a lab Banbury mixer in the amounts shown in Table I, and mixed for about 4.5 minutes to a temperature of about 160° C. In a second non-productive mix stage, the mixture resulting from the first non-productive mix stage was mixed for about 4.5 minutes to a temperature of about 160° C.

The contents of the mixer then were cooled to a temperature of about 23° C. over a period of about 600 minutes. Then the productive-mix-stage ingredients were added to the mixture, in the amounts shown in Table I; and the ingredients were mixed for about 2 minutes to a temperature of about 110° C.

With further reference to Table I, samples B and D were prepared using processing parameters identical to those of sample A. Samples C and E were prepared using those same processing parameters, as well as a third non-productive mix stage. This third mix stage was a cold remill of the second mix stage, with the ingredients being mixed for about 2 minutes to a temperature of about 110° C. In samples B and D, the UHMWPE was added during the first non-productive mix stage; whereas in samples C and E, the UHMWPE was added during the third non-productive mix stage. Also, samples D and E included an additional amount (5 phr) of the mineral oil softener.

TABLE I

| | Samples | | | | |
|---|---|---|---|---|---|
| | A | B | C | D | E |
| First Non-Productive Mix Stage | | | | | |
| BR rubber[1] | 45 | 45 | 45 | 45 | 45 |
| S-SBR (55 phr) extended with TDAE oil[2] (20.63 phr) | 75.63 | 75.63 | 75.63 | 75.63 | 75.63 |
| Antioxidants/Antiozonants[3] | 4 | 4 | 4 | 4 | 4 |
| TDAE oil[4] | 19.38 | 19.38 | 19.38 | 24.38 | 24.38 |
| Fatty acid[5] | 3 | 3 | 3 | 3 | 3 |
| TESPD silane coupling agent[6] | 13.13 | 13.13 | 13.13 | 13.13 | 13.13 |
| UHMWPE[7] | | 5 | | 5 | |
| Silica[8] | 105 | 105 | 105 | 105 | 105 |
| Second Non-Productive Mix Stage | | | | | |
| Third Non-Productive Mix Stage | | Remill of second non-productive mix stage | | | |
| UHMWPE[7] | | | 5 | | 5 |
| Productive Mix Stage | | | | | |
| Antioxidants/Antiozonants[9] | 0.5 | 0.5 | 0.5 | 0.5 | 0.5 |
| Zinc Oxide[10] | 2.5 | 2.5 | 2.5 | 2.5 | 2.5 |
| Sulfur (elemental) | 1.4 | 1.4 | 1.4 | 1.4 | 1.4 |
| Sulfenamide type accelerator[11] | 1.5 | 1.5 | 1.5 | 1.5 | 1.5 |
| Co-accelerator DPG[12] | 2.4 | 2.4 | 2.4 | 2.4 | 2.4 |

[1]Budene 1207
[2]SLR 4630
[3]6-PPD (2.5 phr), refined paraffin wax (0.5 phr), and microcrystalline wax (1 phr)
[4]Vivatec 500
[5]Stearic acid
[6]X-266S
[7]GUR 4120
[8]Degussa VN-2 type (125 m$^2$/g)
[9]DTPD (mixed aryl-p-phenylenediamines)
[10]Untreated French Process
[11]CBS
[12]diphenylguanidine

TABLE II

| | | A | B | C | D | E |
|---|---|---|---|---|---|---|
| Specific Gravity | 23° C. | 100 | 100 | 100 | 99 | 99 |
| Mooney Viscosity | MS (1 + 1.5, 100° C.) | 100 | 112 | 98 | 108 | 88 |
| Rheometer 160 C | Amount | 100 | 99 | 106 | 91 | 93 |
| | T90 | 100 | 95 | 95 | 104 | 95 |
| RPA (550), 1 HZ, 100 C | G' 1% | 100 | 102 | 103 | 90 | 90 |
| | tan d 10% | 100 | 98 | 93 | 97 | 94 |
| Hardness | Shore A 23° C. | 100 | 114 | 104 | 105 | 103 |
| Ring Modulus 23 C | Elongation | 100 | 96 | 89 | 104 | 99 |
| | Mod 100% | 100 | 171 | 129 | 134 | 115 |
| | Mod 300% | 100 | 129 | 126 | 108 | 110 |
| | Tensile Strength | 100 | 110 | 100 | 104 | 103 |
| Zwick Rebound | Rebound 23° C. | 100 | 97 | 98 | 97 | 99 |
| Abrasion | DIN Abrasion | 100 | 113 | 92 | 115 | 99 |
| Metravib, 1.5%, 7.8 Hz | G' −30° C. | 100 | 105 | 106 | 100 | 98 |
| | tan δ −20° C. | 100 | 100 | 102 | 101 | 104 |

With reference to Table II, the experimental results, with respect to plasticity, show that at least samples B and D performed quite well in comparison with the control (sample A). For example, the DIN abrasion and Mooney viscosity values for samples B and D increased relative to the control indicating that the plasticity of such tread cap compositions can be increased, without undesirable effects on other performance characteristics.

While the present invention has been illustrated by the description of embodiments, and while the illustrative embodiments have been described in considerable detail, it is not the intention of the inventors to restrict or in any way limit the scope of the appended claims to such detail. Additional advantages and modifications readily will appear to those skilled in the art. The invention in its broader aspects is therefore not limited to the specific details, representative apparatus and methods, and illustrative examples shown and described. Accordingly, departures may be made from such details without departing from the spirit or scope of the inventors' general inventive concept.

What is claimed is:

1. A method of increasing the plasticity of a tread-cap composition, comprising the steps of:
    mixing, at a temperature in a range of from about 135° C. to about 180° C., ingredients including:
       100 parts by weight of at least one conjugated diene-based elastomer;
       at least one reinforcing filler selected from the group consisting of silica and combinations of silica and carbon black;
       at least one mineral oil softener having a PCA content of less than about 3% by weight;
       from about 4 phr to about 20 phr of at least one silane coupling agent, thereby forming a first mixture;
    subsequently mixing and cooling, to a temperature of from about 23° C. to about 120° C., ingredients, other than a curative, including:
       the first mixture; and
       from about 0.1 phr to about 5 phr of an ultra high molecular weight polyethylene ("UHMWPE"), thereby forming a tire tread-cap composition.

2. The method of claim 1 wherein the reinforcing filler is silica.

3. The method of claim 1 wherein the oil softener is selected from the group consisting of a treated distillate aromatic extract ("TDAE") oil, a mild extraction solvate ("MES") oil, a special residual aromatic extract ("S-RAE"), and combinations thereof.

4. The method of claim 1 wherein the silane coupling agent is selected from the group consisting of bis-3-(triethoxysilyl-propyl) disulfide ("TESPD"), bis-3-(triethoxysilylpropyl) tetrasulfide ("TESPT"), a blocked mercaptosilane, and combinations thereof.

5. The method of claim 1 wherein the UHMWPE is present in an amount of from about 2 phr to about 3 phr.

6. The method of claim 1 further comprising a step of adding a curative to the tire tread-cap composition.

7. The method of claim 1, wherein the at least one reinforcing filler is present in an amount of from about 50 phr to about 130 phr and the at least one mineral oil softener having a PCA content of less than about 3% by weight is present in an amount of from about 5 phr to about 55 phr.

* * * * *